G. SCHWAHN.
PRODUCING ALUMINUM OXID FROM SULFATE OF ALUMINA.
APPLICATION FILED DEC. 12, 1908.

Patented Mar. 23, 1915.

Witnesses:

Inventor:

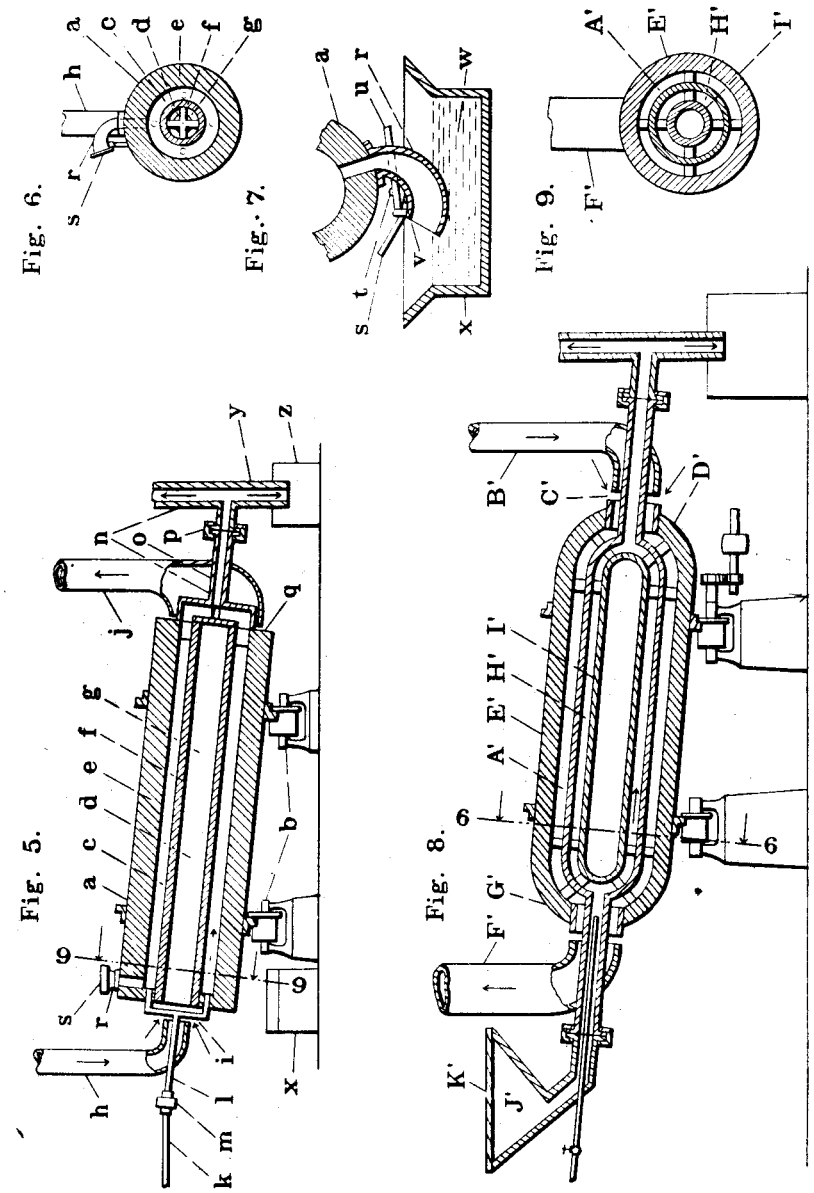

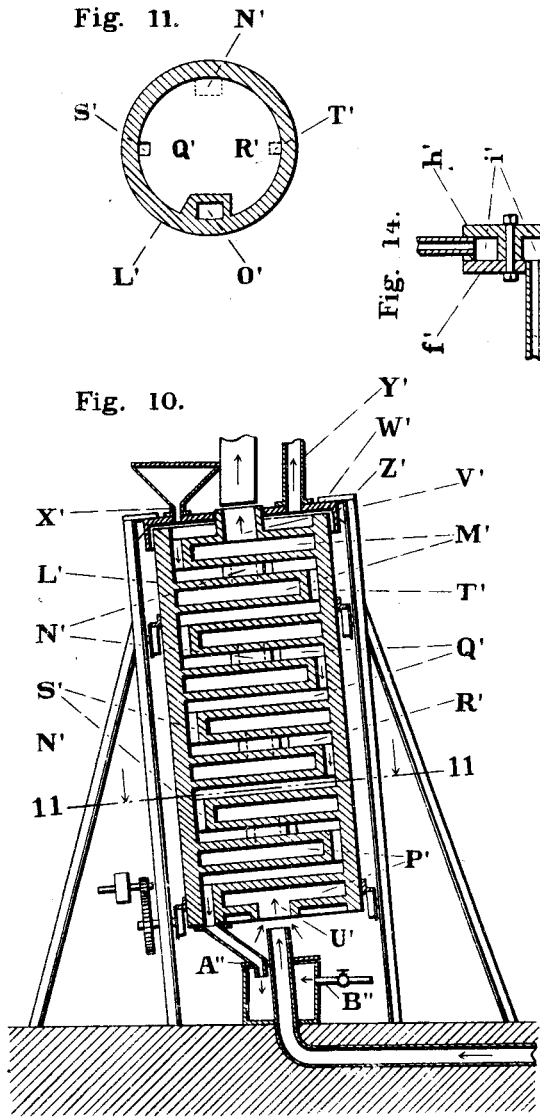

UNITED STATES PATENT OFFICE.

GUSTAVE SCHWAHN, OF BELLEVILLE, ILLINOIS.

PRODUCING ALUMINUM OXID FROM SULFATE OF ALUMINA.

1,132,736.  Specification of Letters Patent.  Patented Mar. 23, 1915.

Application filed December 12, 1908. Serial No. 467,155.

*To all whom it may concern:*

Be it known that I, GUSTAVE SCHWAHN, a citizen of the United States, and resident of the city of Belleville, in the county of St. Clair and State of Illinois, have invented certain new and useful Improvements in Producing Aluminum Oxid from Sulfate of Alumina, of which the following is an exact specification.

This invention relates to the production from aluminum sulfate of the oxid of aluminum (alumina), suitable for electrolytic reduction to aluminum. While sulfuric acid combines with aluminum in several proportions, the sulfate of aluminum that I have in view as the most desirable for my purposes may be represented by the formula $Al_2(SO_4)_3$, that is, dehydrated or calcined normal sulfate of aluminum. This material I subject to adequate heat and steam to drive off the acid in dissociated form, substantially as hereinafter more fully described and claimed.

It is known that by subjecting incandescent aluminum sulfate to the action of hydrogen gas the sulfate is decomposed, forming water and sulfur dioxid, and leaving alumina nearly free of acid. Such a process is however, not commercially operative, at the present day, as the production of hydrogen gas is too expensive. The use of water gas, which contains free hydrogen, does not permit the production of alumina free both of sulfur and of aluminum compounds containing sulfur and carbon, which are objectionable in the reduction of alumina to metal by electrolysis from a bath of fused fluorids as practised at the present time, and moreover, water-gas is also too expensive.

In my improved process I use steam or aqueous vapors to act upon heated anhydrous aluminum sulfate, and separate the acid and impurities from the contained alumina, the alumina thus obtained being entirely free from acid and the impurities lessened in amount.

Figure 1:
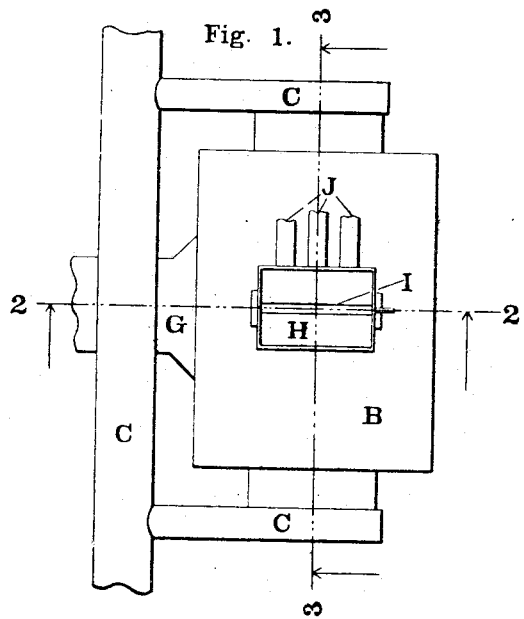
Figure 2:
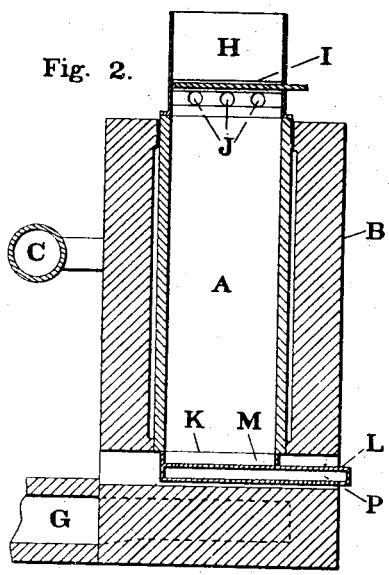
Figure 3:
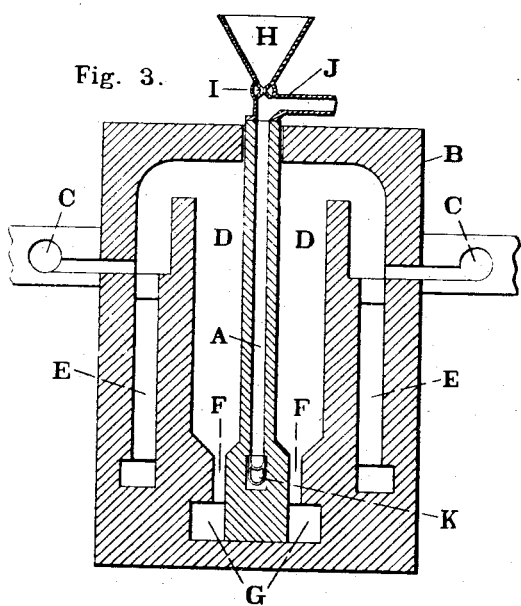
Figure 4:
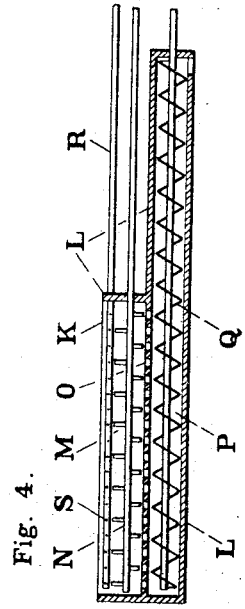

In the accompanying drawings, which form part of this specification, and wherein like symbols refer to like parts wherever the symbols occur,—Figure 1 is a plan view of the type of furnace preferably used in applying my process; Fig. 2 is a vertical cross section of the furnace on the line 2—2 of Fig. 1, looking in the direction indicated by the arrows corresponding to the line 2—2, Fig. 1; Fig. 3 is a vertical longitudinal section on the line 3—3 of Fig. 1, looking in the direction indicated by the arrows corresponding to the line 3—3, Fig. 1; Fig. 4 is a longitudinal section on the line 2—2 of Fig. 1 of a device for supplying gas or vapor to the retort, which forms part of the furnace, and for discharging the retort; Fig. 5 is a vertical longitudinal section of a modified form of furnace, which may be used in applying my process; Fig. 6 is a cross section of the said furnace on the line 6—6 of Fig. 5, looking in the direction indicated by the arrows corresponding to the line 6—6, Fig. 5; Fig. 7 is a detail of the said furnace; Fig. 8 is a vertical longitudinal section of a modified form of furnace, which may be used in applying my process; Fig. 9 is a cross section of the said furnace on the line 9—9 of Fig. 8, looking in the direction indicated by the arrows corresponding to the line 9—9 of Fig. 8; Fig. 10 is a vertical longitudinal section of a modified form of furnace which may be used in applying my process; Fig. 11 is a cross section of the said furnace on the line 11—11 of Fig. 10, looking in the direction indicated by the arrows corresponding to the line 11—11, Fig. 10; Fig. 12 is a vertical longitudinal section of a modified form of furnace, which may be used in applying my process; Fig. 13 is a cross section of the said furnace on the line 13—13 of Fig. 12, looking in the direction indicated by the arrows corresponding to the line 13—13, Fig. 12; and Fig. 14 is a detail of the said furnace.

In carrying out my invention, I preferably use a suitable retort A within a suitable furnace B, in the apparatus shown in Figs. 1 to 4. The retort is constructed of fire brick or other material capable of resisting temperatures up to 1200 degrees centigrade and is separate from the furnace. The inside of the retort measures not over eight inches in width, and preferably about eight feet or more in height. The furnace B shown in the drawings is intended to be heated with gas, which enters the furnace B by the pipes C which convey the gas to the upper portion of the combustion chamber D. Air, which may be preheated, is also conveyed into the upper portion of the combustion chamber D by pipes E. The products of combustion leave the lower portion of the combustion chamber D through passages F connecting the combustion chamber D with a flue G. Material may be fed into the upper part of the retort A from a hopper H by means of a feeding device I, which is substantially gas tight. The hopper H and feeding device I may comprise connections for a pipe or pipes J, which connect with the retort A below the feeding device I. These pipes J convey the gaseous products away from the retort. The solid product of the retort may be discharged by means of a device K, comprising a body portion L, which is divided into two parts. The upper part M comprises a feeding device N, which by revolving causes the contents of the retort to pass through perforations O connecting the upper part M of the discharging device K to the lower part P. The lower part P of the discharging device K, in connection with a screw Q, forms a screw conveyer, by means of which the solid products of the retort may be conveyed away from the furnace. The upper portion M of the discharging device K contains a pipe or pipes R comprising perforations S. These pipes R convey gases or vapors into the retort. Into such a retort, after heating it to an adequate temperature, which may be about orange red or orange heat, I charge the anhydrous aluminum sulfate, which is preferably in the form of a porous mass, through the feeding device provided therefor in its upper part or top. As soon as the charge is heated to incandescence I introduce steam or water in moderate amounts into the lower part of the retort, where it becomes heated, whereby steam, or the aqueous vapors resultant from heating the water, will be brought into contact with the incandescent aluminum sulfate. This vapor is then in such condition, and under such pressure as to permeate through and act upon the porous aluminum sulfate, liberating the acid. The water vapor in this condition and the incandescent porous sulfate coming in intimate contact, form sulfur-oxygen compounds and water, which pass off as gases. These sulfur-oxygen compounds may be collected and suitably treated to form sulfuric acid for the production of more sulfate.

The alumina, entirely freed from the acid, is discharged at the bottom of the apparatus by means of the device shown, or other suitable means. The process may be carried on in a continuous operation by charging the sulfate from above as fast as the alumina is taken out from below.

The continuous method of operation presents many advantages in practice. The column of aluminum sulfate may be progressively advanced through the furnace against the moving current of vapor in such a manner that the very hot, nearly sulfur-free alumina first contacts with the fresh water vapor which, of course, will be free, or substantially so, of sulfur compounds and will exercise its maximum effect. In this continuous manner of operation, any convenient form of apparatus may be employed; any apparatus which will permit the continuous progression of a column or layer of sulfate of alumina in the contrary direction to a current of water vapor which may be highly superheated. Heating means must of course be provided which will allow of the production and maintenance of uniform temperatures and temperature gradations in all parts of the apparatus.

In the apparatus shown in Figs. 5, 6 and 7, a furnace $a$ having a general cylindrical form is mounted on rollers $b$, so that it may be revolved about the axis of the cylinder by any suitable means. The furnace $a$ comprises two chambers $c$ and $d$ through the outer one of which the material to be treated passes. This outer chamber $c$ is formed by a tube $e$ comprising suitable refractory material forming the outer wall of the furnace and the inner tube $f$ forming the inner wall of the said outer chamber $c$ and the second chamber, which is a combustion chamber $g$. The outer chamber or space $c$ for the material is made narrow. The gases for combustion enter the combustion chamber from a tube $h$. Air for combustion enters the combustion chamber through a suitable opening or openings $i$. Neither the tube $h$, conveying gas to the furnace, nor the stack $j$ comes in direct contact with the revolving portion of the furnace. Gas or vapor is supplied to the outer chamber $c$ from a tube $k$, a portion of which $l$, comprising a swivel joint $m$, is concentric with the cylindrical furnace $a$. A second tube $n$, a portion of which $o$, comprising a swivel joint $p$, concentric with the cylindrical furnace $a$, is connected with one end $q$ of the furnace $a$. The furnace is revolved so that the material is carried through it by gravity. A suitable bent tube $r$ with a hinged cover $s$, which opens by a pin $t$ striking a portion $u$ thereof and overcoming the pressure of the spring $v$, picks up the material to be treated $w$ from a suitable receptacle $x$ and drops it into the outer chamber $c$. The material leaves the furnace $c$ by the tube $n$ leading to an acid chamber, being carried into the said tube $n$ by gases passing through the outer chamber $c$ and by the revolving action of the furnace and by gravity. The stationary portion of this hereinbefore mentioned second tube $n$ connected with one end $q$ of the furnace comprises a branch $y$ which extends downwardly and is open at the lower end. The material drops through this branch into a suitable receptacle $z$.

The cylindrical furnace, Figs. 5, 6 and 7, hereinbefore described, may be modified by carrying the gas and air for combustion to the combustion chamber A', Figs. 8 and 9, by a suitable tube B' and through a suitable opening C' to the lower end D' of the furnace E' and carrying away the products of combustion through a suitable tube F' connecting with the upper end G' of the furnace. The material chamber H' is made the inner chamber H' in place of the outer chamber. In this case the space for the material may be made narrow by placing a cylindrical device I' of suitable refractory material in the said inner chamber H'. The hopper or receptacle J' for the material may be closed by a suitable cover K'.

The axes of the revolving furnaces hereinbefore described may be made so as to incline at a small angle with a vertical line in place of a horizontal line. Figs. 10 and 11 show a furnace of this kind. In this furnace L' a series of low cylindrical chambers M' connected by suitable passageways N', O' form the combustion chamber P', and a similar series of chambers Q' form the material chamber R'. The passageways S', T', connecting the series of low cylindrical material chambers Q' are made small so as to bring gas or vapor in intimate contact with all the material. Each passageway S' that permits the material to drop into any one low cylindrical chamber Q' is placed diametrically opposite the passageway T' that permits the material to drop to the next lower chamber, so that as the material passes through the furnace the material must pass through each chamber Q' in succession. The successive passageways N', O' connecting the low cylindrical combustion chambers M' are similarly located with respect to each other. The lowest passageway U' for gas and air and the uppermost passageway V' for products of combustion are concentric with the axis of the cylindrical furnace. The top W' of the furnace to which the material supply pipe X' and the pipe Y' to the acid chamber are connected is stationary and forms a hood Z' with respect to the revolving furnace L'. The cover A'' of the receptacle for treated materials swivels with respect to the said receptacle. The gas or vapor pipe B'' enters the said receptacle.

In carrying out my invention the material may be made to pass through the chamber in which the combustion takes place. Figs. 12, 13 and 14 show a revolving cylindrical furnace of this kind. The material enters the furnace a' through a fixed pipe b' moves along the bottom of the combustion chamber c' in a thin layer and leaves the furnace by a small pipe d' attached to and revolving with the furnace a'. The gas or vapor enters the furnace a' through a pipe e' comprising a swivel joint f' concentric with the revolving furnace a'. This swivel joint f' comprises a fixed portion g' and a revolving portion h' with four passageways i', so placed as to form a fourway valve. The passageway j' in the fixed portion g' of this device is so placed that it connects with each of the four passageways i' in the revolving portion h' in succession, when one of the said passageways i' connecting with that one of the four pipes k' placed in the furnace lining and having a series of openings l' into the furnace a' is in its lowest position during each revolution. Gas or vapor consequently enters the lowest portion of the cylinder only and comes in direct contact with the material. The four hereinbefore mentioned gas or vapor pipes k' are not as long as the combustion chamber c'. The material is consequently heated before it comes in contact with the gas or vapor.

An important advantage of my process is that with the separation of the acid from the aluminum sulfate and the setting free of the alumina, the alumina is also partly, if not wholly, freed from all impurities, such as iron, titanic acid or even silica, which may have been contained in the sulfate. It is not essential to a successful operation of the present process that the sulfate be in a porous condition or that the steam supplied to the furnace be in superheated condition.

While I consider the furnace illustrated in Figs. 1 to 4 to be best adapted to commercial production of alumina from aluminum sulfate by my process, my process is not restricted to the use of this furnace.

The rotary furnaces shown in Figs. 5 to 14, or any furnace adapted to accomplish the uniform heating of the sulfate and intimate admixture of the water vapor therewith, substantially as described, may be used.

No claim is made herein for the furnace constructions shown in the accompanying drawings and described above, but the new and useful features thereof are expressly reserved for a future application for Letters Patent.

I claim as new, and as my invention:

1. The production of aluminum oxid from aluminum sulfate by means which consists in charging anhydrous aluminum sulfate in a porous condition into a retort in a furnace, heating said sulfate to incandescence throughout, and then charging water, aqueous vapors or steam into said retort while maintaining the sulfate at a uniform temperature until all the sulfuric acid is removed, substantially as described.

2. The improved process of producing aluminum oxid, which consists in subjecting porous aluminum sulfate in the presence of aqueous vapors or steam to about an orange red or orange heat, substantially as and for the purpose set forth.

3. The process of producing acid free aluminum oxid which consists in heating aluminum sulfate to incandescence in one part of a chamber of a suitable retort or furnace, while heating water, aqueous vapor or steam in another part or chamber of said retort or furnace, and subjecting said sulfate of alumina to the action of said vapor or steam until all the contained sulfuric acid is removed in a dissociated form, substantially as and for the purpose set forth.

4. The process of producing pure aluminum oxid, which consists in heating a suitable aluminum sulfate in a suitable retort or furnace to incandescence and injecting water, aqueous vapors or steam into said retort or furnace to act upon said incandescent sulfate thereby separating the acid with the impurities from said sulfate and leaving pure aluminum oxid, said reaction being carried on at a point above the dissociating temperature of sulfuric acid.

5. The process of producing acid free aluminum oxid, which consists in subjecting aluminum sulfate to heat in one part of a retort or furnace, and heating water or steam in another part of said retort or furnace, and conveying the resultant vapor or steam upon and through said aluminum sulfate at a uniform temperature until all the contained sulfuric acid is driven off in a dissociated form, substantially as and for the purpose set forth.

6. The process of producing acid free alumina from alumina sulfur compounds consisting in uniformly heating at an orange heat porous aluminum sulfate in the presence of water vapor until the sulfur is driven off.

7. The process of producing acid free alumina from sulfate of aluminum which consists in rapidly and uniformly heating anhydrous aluminum sulfate to a temperature below the temperature of fusing, and passing steam through the heated mass.

8. The process of producing acid free aluminum oxid which consists in uniformly heating porous aluminum sulfate to above 800 degrees centigrade but below the fusing temperature and passing steam through said mass.

GUSTAVE SCHWAHN.

Witnesses:
H. F. D. SCHWAHN,
EDWARD W. WEST, Jr